(12) United States Patent
Jakobsson et al.

(10) Patent No.: US 10,494,728 B2
(45) Date of Patent: Dec. 3, 2019

(54) PROCESS FOR PRODUCING CO FROM $CO_2$ IN A SOLID OXIDE ELECTROLYSIS CELL

(71) Applicant: Haldor Topsøe A/S, Kgs. Lyngby (DK)

(72) Inventors: Niklas Bengt Jakobsson, Kågeröd (SE); Claus Friis Pedersen, Vanløse (DK); John Bøgild Hansen, Copenhagen Ø (DK)

(73) Assignee: Haldor Topsoe A/S, Lyngby (DK)

( * ) Notice: Subject to any disclaimer, the term of this patent is extended or adjusted under 35 U.S.C. 154(b) by 869 days.

(21) Appl. No.: 14/780,462

(22) PCT Filed: Mar. 26, 2013

(86) PCT No.: PCT/EP2013/056411
§ 371 (c)(1),
(2) Date: Sep. 25, 2015

(87) PCT Pub. No.: WO2014/154253
PCT Pub. Date: Oct. 2, 2014

(65) Prior Publication Data
US 2016/0040311 A1    Feb. 11, 2016

(51) Int. Cl.
*C25B 13/00*    (2006.01)
*C25B 15/08*    (2006.01)
(Continued)

(52) U.S. Cl.
CPC ............ *C25B 15/08* (2013.01); *B01D 53/047* (2013.01); *C25B 1/00* (2013.01); *C25B 9/00* (2013.01);
(Continued)

(58) Field of Classification Search
CPC ......... Y02E 60/366; C25B 15/08; C25B 1/00; C25B 15/00; C25B 15/02; C25B 9/18
(Continued)

(56) References Cited

U.S. PATENT DOCUMENTS

| | | | |
|---|---|---|---|
| 6,106,966 A | 8/2000 | Crow | |
| 2006/0130647 A1* | 6/2006 | Dunn | ...................... C01B 3/501 95/45 |

(Continued)

FOREIGN PATENT DOCUMENTS

| | | |
|---|---|---|
| CN | 102834163 A | 12/2012 |
| EP | 0 129 444 A2 | 12/1984 |

(Continued)

OTHER PUBLICATIONS

J. B. Hansen et al., "Production of Sustainable Fuels by Means of Solid Oxide Electrolysis." ECS Transactions, vol. 35, No. 1, pp. 2941-2948, 2011.

(Continued)

*Primary Examiner* — Zulmariam Mendez
(74) *Attorney, Agent, or Firm* — Blank Rome LLP

(57) ABSTRACT

The invention concerns a process for producing carbon monoxide (CO) from carbon dioxide ($CO_2$) in a solid oxide electrolysis cell (SOEC) or SOEC stack, wherein $CO_2$ is led to the fuel side of the stack with an applied current and excess oxygen is transported to the oxygen side of the stack, optionally using air or nitrogen to flush the oxygen side, and wherein the product stream from the SOEC, containing CO mixed with $CO_2$, is subjected to a separation process. The process further comprises heating the inlet gas on both the fuel side and the oxygen side by means of separate heating units, so as to supply heat to the SOEC, where the operation temperature of said heating units is at least equal to the operation temperature of the cell stack minus 50° C., preferably at least equal to the operation temperature of the cell stack.

19 Claims, 16 Drawing Sheets

(51) Int. Cl.
- *C25B 15/00* (2006.01)
- *C25B 1/00* (2006.01)
- *C25B 9/00* (2006.01)
- *C25B 9/18* (2006.01)
- *B01D 53/047* (2006.01)
- *C25B 15/02* (2006.01)

(52) U.S. Cl.
CPC ............ *C25B 9/18* (2013.01); *C25B 15/00* (2013.01); *C25B 15/02* (2013.01); *B01D 2253/102* (2013.01); *B01D 2253/104* (2013.01); *B01D 2253/1122* (2013.01); *B01D 2253/1124* (2013.01); *B01D 2256/20* (2013.01); *B01D 2257/504* (2013.01); *B01D 2259/402* (2013.01); *Y02E 60/366* (2013.01)

(58) Field of Classification Search
USPC ........................................................ 204/412
See application file for complete search history.

(56) References Cited

U.S. PATENT DOCUMENTS

2008/0023338 A1    1/2008   Stoots et al.
2011/0253551 A1   10/2011   Lane et al.

FOREIGN PATENT DOCUMENTS

WO    WO 2011/133264 A1    10/2011
WO    WO 2013/131778 A2     9/2013

OTHER PUBLICATIONS

S. D. Ebbesen et al., "Electrolysis of Carbon Dioxide in Solid Oxide Electrolysis Cells." Journal of Power Sources, vol. 193, pp. 349-358, 2009.

* cited by examiner

Definitions

PROCESS FOR PRODUCING CO FROM $CO_2$ IN A SOLID OXIDE ELECTROLYSIS CELL

This invention belongs to the field of electrolysis conducted in solid oxide electrolysis cell (SOEC) stacks. A solid oxide electrolysis cell is a solid oxide fuel cell (SOFC) run in reverse mode, which uses a solid oxide or ceramic electrolyte to produce e.g. oxygen and hydrogen gas by electrolysis of water. FIG. 1 shows the principle build-up of a solid oxide electrolysis cell system. It comprises an SOEC core wherein the SOEC stack is housed together with inlets and outlets for process gases. The feed gas, often called the fuel gas, is led to the cathode part of the stack, from where the product gas from the electrolysis is taken out. The anode part of the stack is also called the oxygen side, because oxygen is produced on this side.

The present invention relates to a process for producing carbon monoxide (CO) from carbon dioxide ($CO_2$) in a solid oxide electrolysis cell (SOEC) or SOEC stack, wherein $CO_2$ is led to the fuel side of the stack with an applied current and excess oxygen is transported to the oxygen side of the stack, optionally using air or nitrogen to flush the oxygen side, and wherein the product stream from the SOEC, containing CO mixed with $CO_2$, is subjected to a separation process.

It is known that CO may be produced from $CO_2$ by electrolysis. Thus, US 2007/0045125 A1 describes a method for preparing synthesis gas (syngas comprising carbon monoxide and hydrogen) from carbon dioxide and water using a sodium-conducting electrochemical cell. Syngas is also produced by co-electrolysis of carbon dioxide and steam in a solid oxide electrolysis cell.

U.S. Pat. No. 8,138,380 B2 describes an environmentally beneficial method of producing methanol by reductively converting carbon dioxide, said method including a step in which recycled carbon dioxide is reduced to carbon monoxide in an electrochemical cell.

From US 2008/0023338 A1 a method for producing at least one syngas component by high temperature electrolysis is known. The syngas components hydrogen and carbon monoxide may be formed by decomposition of carbon dioxide and water or steam in a solid oxide electrolysis cell to form carbon monoxide and hydrogen, a portion of which may be reacted with carbon dioxide to form carbon monoxide utilizing the so-called reverse water gas shift (WGS) reaction.

US 2012/0228150 A1 describes a method of decomposing $CO_2$ into C/CO and $O_2$ in a continuous process using electrodes of oxygen deficient ferrites (ODF) integrated with a YSZ electrolyte. The ODF electrodes can be kept active by applying a small potential bias across the electrodes. $CO_2$ and water can also be electrolysed simultaneously to produce syngas ($H_2$+CO) and $O_2$ continuously. Thereby, $CO_2$ can be transformed into a valuable fuel source allowing a $CO_2$ neutral use of hydrocarbon fuels.

Finally, U.S. Pat. No. 8,366,902 B2 describes methods and systems for producing syngas utilising heat from thermochemical conversion of a carbonaceous fuel to support decomposition of water and/or carbon dioxide using one or more solid oxide electrolysis cells. Simultaneous decomposition of carbon dioxide and water or steam by one or more solid oxide electrolysis cells can be employed to produce hydrogen and carbon monoxide.

Besides the above-mentioned patents and patent applications, the concept of electrolysing $CO_2$ in solid oxide electrolysis cells is described in "Modeling of a Solid Oxide Electrolysis Cell for Carbon Dioxide Electrolysis", a publication by Meng Ni of the Hong Kong Polytechnic University, and also by Sune Dalgaard Ebbesen and Mogens Mogensen in an article entitled "Electrolysis of Carbon Dioxide in Solid Oxide Electrolysis Cells", Journal of Power Sources 193, 349-358 (2009).

Specifically the present invention relates to a process for producing carbon monoxide (CO) from carbon dioxide ($CO_2$) in a solid oxide electrolysis cell (SOEC) stack, wherein $CO_2$ is led to the fuel side of the SOEC with an applied current, said process further comprising:

heating the inlet gas on the fuel side by means of a heating unit, so as to supply heat to the SOEC, wherein the operation temperature of said heating unit is at least the operation temperature of the cell stack minus 50° C., preferably at least the operation temperature of the cell stack, and heating the inlet gas on the oxygen side by means of a heating unit, so as to supply heat to the SOEC, wherein the operation temperature of said heating unit is at least the operation temperature of the cell stack minus 50° C., preferably at least the operation temperature of the cell stack. The content of CO in the output from the SOEC stack is preferably 20-80 wt %.

DETAILED DESCRIPTION OF THE PREFERRED EMBODIMENTS

The principle underlying the present invention consists in leading $CO_2$ to the fuel side of an SOEC with an applied current to convert $CO_2$ to CO and transport the oxygen surplus to the oxygen side of the SOEC. Air, nitrogen or carbon dioxide may be used to flush the oxygen side. Flushing the oxygen side of the SOEC has two advantages, more specifically (1) reducing the oxygen concentration and related corrosive effects and (2) providing means for feeding energy into the SOEC, operating it endothermic. The product stream from the SOEC contains mixed CO and $CO_2$, which is led to a separation process such as pressure swing adsorption (PSA), temperature swing adsorption (TSA), membrane separation, cryogenic separation or liquid scrubber technology, such as wash with N-methyl-diethanolamine (MDEA).

PSA is especially suitable for the production of high purity CO according to the present invention. Carbon dioxide is the most abundant impurity. However, due to impurities in the $CO_2$ feed or due to leakage in the SOEC unit, trace amounts of $N_2$ and $H_2$ may be present in the feed gas to the PSA unit.

Figure 15:
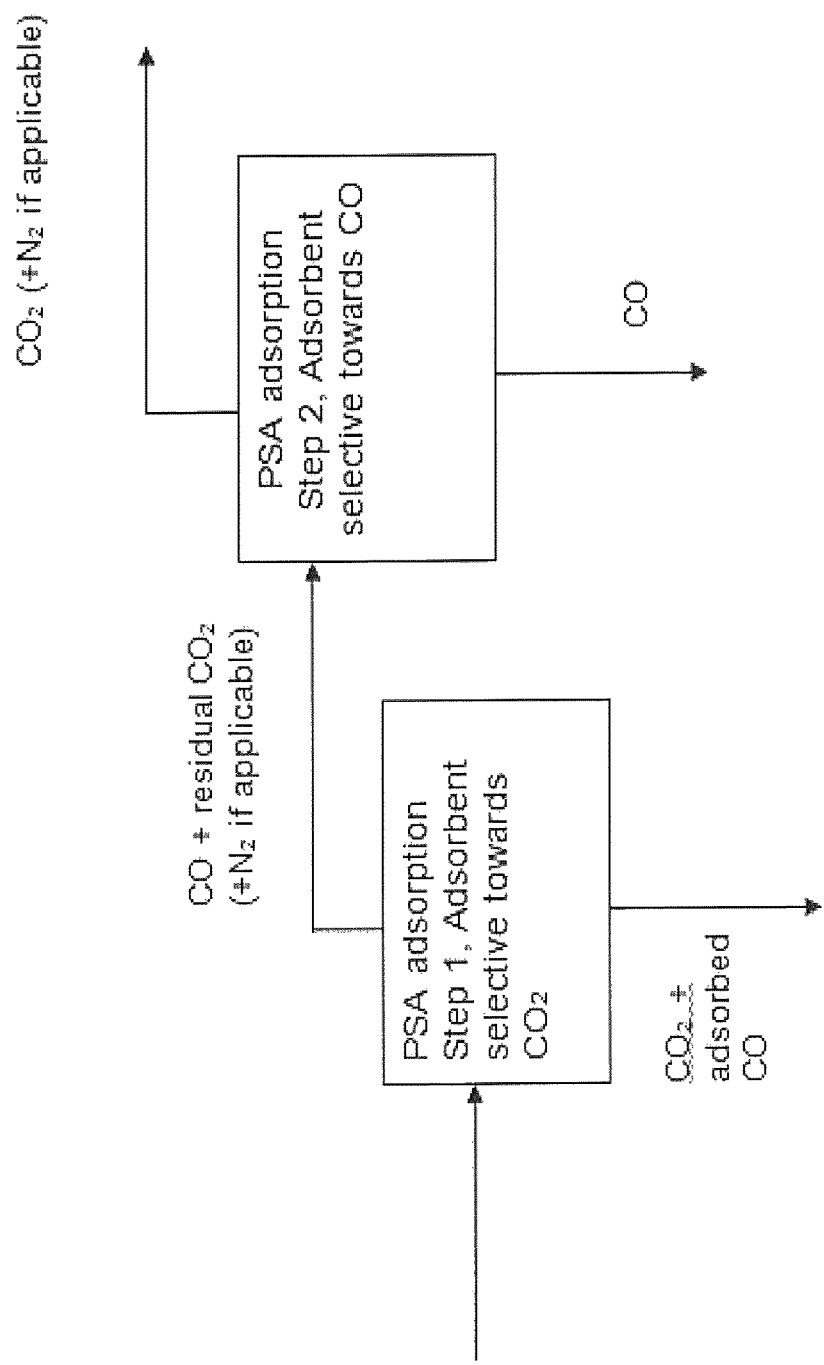
FIG. 15 shows an embodiment in which carbon dioxide is removed from the gas mixture with two adsorption columns, each containing adsorbents exhibiting selective adsorption properties towards carbon dioxide.

In order to remove carbon dioxide an adsorption comprising at least two adsorption columns, each containing adsorbents exhibiting selective adsorption properties towards carbon dioxide, can be used to remove $CO_2$ from the gas mixture. This embodiment is shown in FIG. 15. Furthermore, a second adsorption step can be employed to further remove carbon dioxide in addition to other pollutants such as nitrogen. This adsorption step comprises at least two adsorption columns, each containing adsorbents exhibiting selective adsorption properties towards carbon monoxide. Such an adsorption step may be used alone or as a second step in combination with the above mentioned adsorption step selective towards $CO_2$. Adsorbents being selective regarding carbon monoxide adsorption include activated carbon, natural zeolites, synthetic zeolites, polystyrene or mixtures thereof. In particular, addition of copper or aluminium halides to any of the materials mentioned above to introduce monovalent copper ions and/or trivalent aluminium onto the materials is beneficial with respect to carbon monoxide selectivity and capacity. Optionally, the addition of Cu or Al can be combined with impregnation of carbon onto the carrier to preserve the oxidation stage of Cu and Al. In addition, in the case of a zeolite material, copper ions can be introduced into the zeolite material by ion exchange to increase the carbon monoxide selectivity and capacity.

Figure 1:
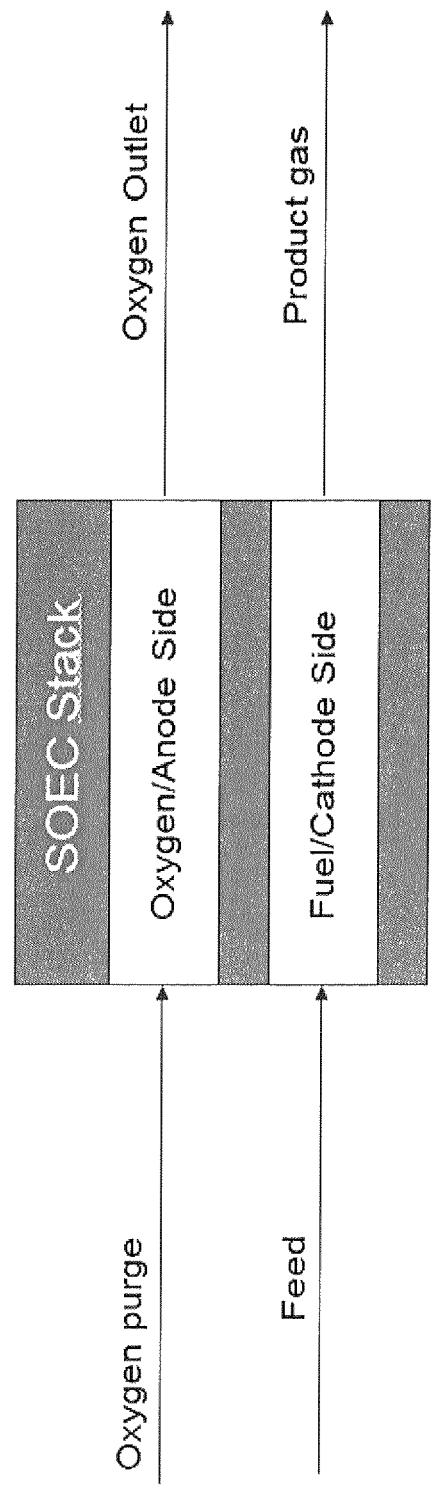
FIG. 1 shows the principle build-up of a solid oxide electrolysis cell system.
Figure 2:
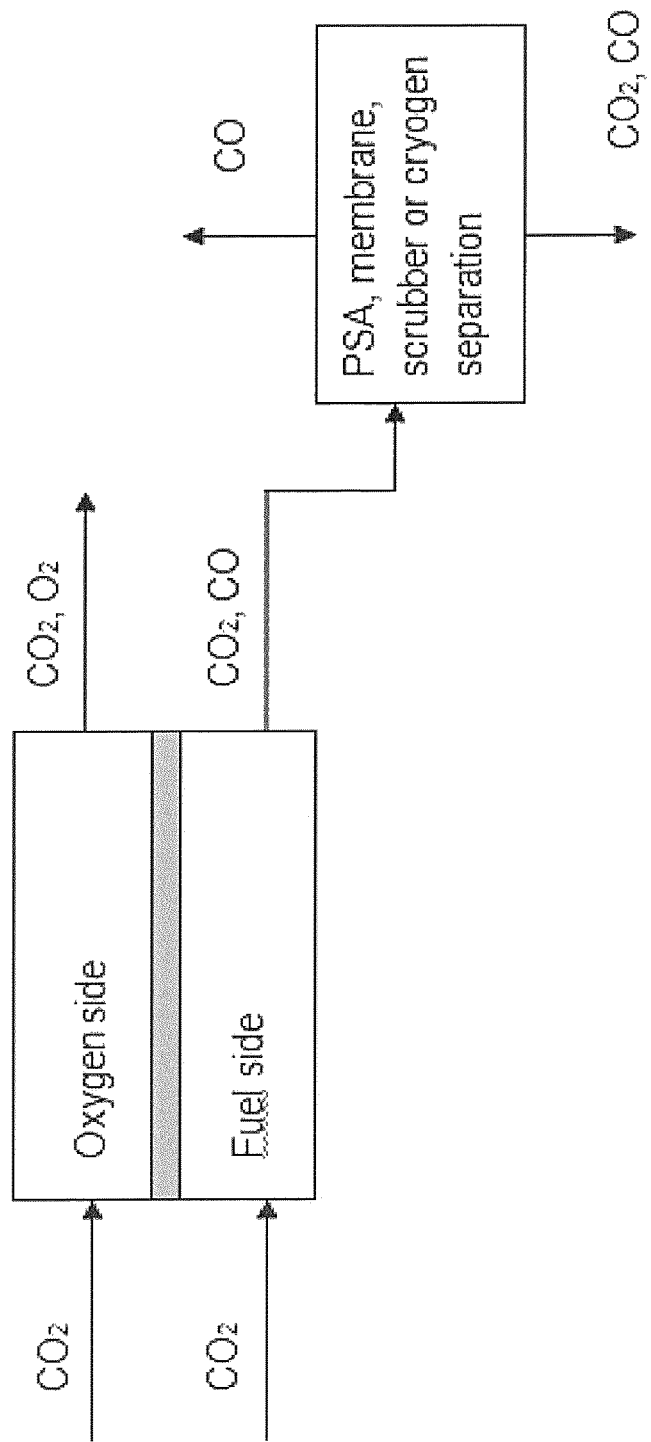
FIG. 2 shows the basic principle of the invention.

This basic principle of the invention is illustrated in FIG. 2. Various embodiments of the process according to the invention will appear from the following detailed description of the invention.

In the above layout according to the basic principle of the invention there is a significant risk that gas may leak from the oxygen side to the fuel side of the SOEC. In the case that air is used on the oxygen side, the oxygen is quickly consumed on the fuel side as carbon monoxide reacts with oxygen to form carbon dioxide. This may occur spontaneously at the elevated operating temperatures used in the cell (typically above 700° C.) or on the Ni which is present as part of the fuel side.

A more severe issue is that also nitrogen may leak over to the fuel side, and $N_2$ is difficult to separate effectively from CO in the downstream purification process which, as mentioned, uses PSA, TSA, membrane separation, cryogenic separation or liquid scrubber technology, such as wash with N-methyl-diethanolamine (MDEA). This means that high purity CO is difficult to obtain. However, if $CO_2$ is used on the oxygen side instead of air, this issue is mitigated and the gases present in the system are restricted to only CO, $CO_2$ and $O_2$.

The electrolysis process in the SOEC requires an operating temperature between 650 and 850° C. Depending on the specific operating conditions, stack configuration and the integrity of the stack, the overall operation can consume heat (i.e. be endothermic), it can be thermoneutral or it can generate heat (i.e. be exothermic). Any operation carried out at such high temperatures also leads to a significant heat loss. This means that typically it will require external heating to reach and maintain the desired operating temperature.

Figure 3:
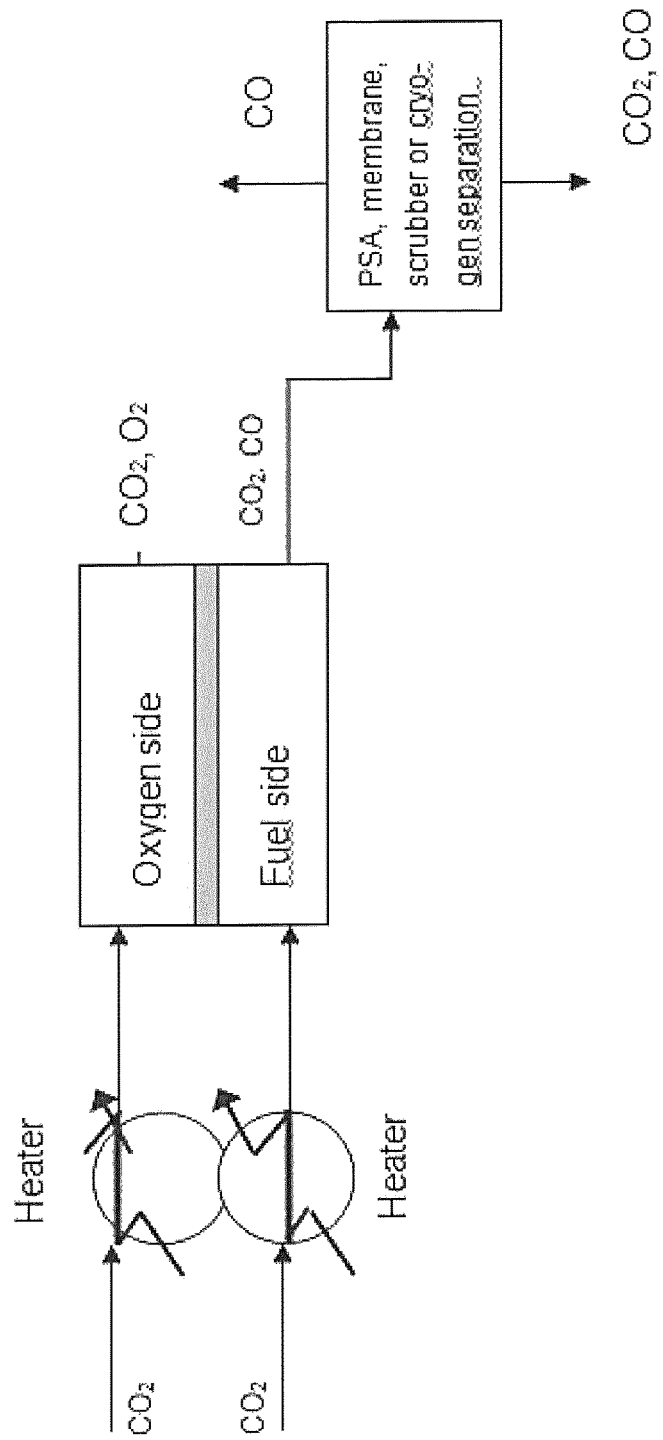
FIG. 3 shows the layout of an embodiment of the invention in which external heaters are used to heat the inlet gas on the oxygen side and the fuel side.

When the operation is carried out at a sufficiently large current in the SOEC stack, the necessary heat will eventually be generated, but at the same time the degradation of the stack will increase. Therefore, in another embodiment of the process external heaters are used to heat the inlet gas on the oxygen side and the fuel side in order to supply heat to the SOEC stack, thereby mitigating this issue. Such external heaters are also useful during start-up as they can provide heat to help the SOEC reach its operating temperature. Suitable feed gas temperatures would be around 700 to 850° C. The external heaters can be electrical, but gas or liquid fuelled external heaters may also be used. The apparatus layout corresponding to this embodiment of the process is illustrated in FIG. 3.

Figure 4:
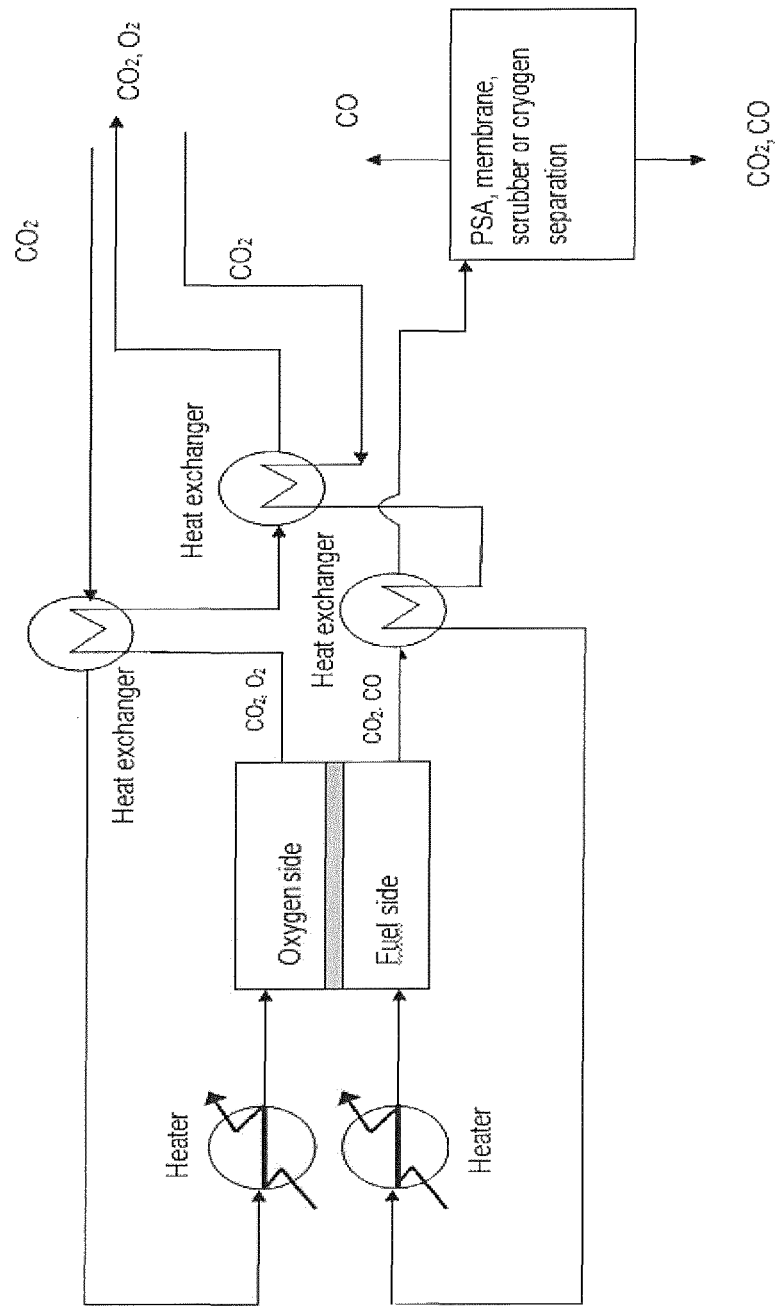
FIG. 4 shows an embodiment of the invention incorporating heat exchangers.

In addition to using inlet gas heaters to obtain the necessary operating temperature, the hot exhaust gas on the oxygen side and the fuel side may be utilized to heat the inlet gas. This is another way to maintain a suitable operating temperature for the SOEC and at the same time reduce the load on the heaters. Thus, by incorporating a feed effluent heat exchanger on both the oxygen side and the fuel side, the issues related to high temperature operation and heat loss are further mitigated. In accordance with the nature of the SOEC operation, mass ($O_2$) is transferred from the fuel side to the oxygen side, which leads to a limitation on the maximum temperature that can be reached in the feed effluent heat exchanger on the fuel side alone. As a consequence of this, there will be an increase of mass through the SOEC on the oxygen side, which leads to the creation of an excess of heat in the SOEC oxygen outlet stream. This in turn leads to a surplus of heat in the outlet stream from the feed effluent heat exchanger on the oxygen side also. Thus, in order to utilize this excess heat on the oxygen side, a third feed effluent heat exchanger is implemented, said third heat exchanger transferring heat from the hot outlet side of the feed effluent heat exchanger on the oxygen side to the cold inlet of the feed effluent heat exchanger on the fuel side. By using electrical tracing in combination with high-temperature insulation on the connecting pipes between the heaters and the heat exchangers as well as between the heat exchangers, the heaters and the stack, the desired temperature level in the SOEC stack can be further conserved. The apparatus layout corresponding to this embodiment of the process is illustrated in FIG. 4.

Figure 5:
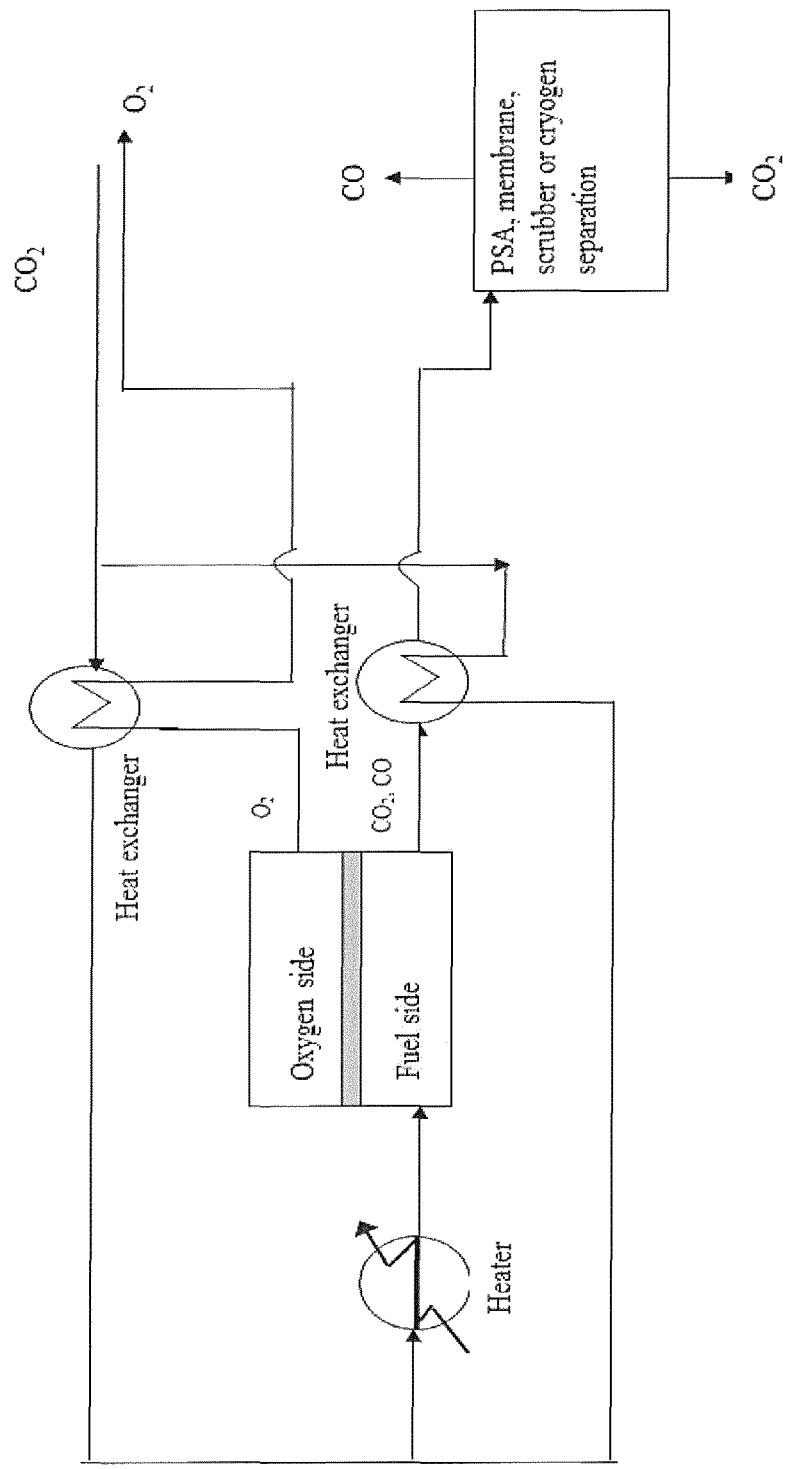
FIG. 5 shows a modification of the embodiment of FIG. 4, in which no flushing on the oxygen side is used, and feed gas is provided by two individually controlled flows.

Due to the transfer of oxygen ions from the fuel side to the oxygen side of the SOEC system the thermal mass of the fuel/oxygen input and output flows will be different when electrolysis is performed. As this difference will vary with the oxygen flow, which is proportional to the (possibly changing) current, it is in general not possible to recuperate all the heat from the SOEC output gases for all operating conditions illustrated in FIG. 4. As a heat effective alternative, the configuration shown in FIG. 5 can be used. Here, no flushing on the oxygen side is used, and feed gas ($CO_2$) is provided by two individually controlled flows. One flow (a) shares a heat exchanger (A) with the output flow from the SOEC fuel side, and the other flow (b) shares a heat exchanger (B) with the output flow from the oxygen side of the SOEC. By adjusting the flows (a) and (b) while maintaining the desired total input (a+b) it is possible to assure equal thermal masses of the inputs to the two heat exchangers. This makes it possible to obtain an ideal recuperation of the heat from the SOEC for all CO production conditions desired (e.g. variations of CO production rate and $CO/CO_2$ ratio in the fuel output gas).

The introduction of feed effluent heat exchangers increases the efficiency with respect to power consumption of the plant, and it also greatly reduces the load on the high temperature heaters. However, with respect to the cooling-down rate in case of a plant trip or shut-down, the feed effluent heat exchangers will slow down and restrict the maximum rate of cooling by insertion of cold gases at the feed and purge inputs. In order to mitigate SOEC degradation during trip or shut-down it is beneficial to be able to control the cooling-down rate closely. In particular fast cooling is desirable when electrical anode protection (EAP) is used during a power failure, where the electrical protection is provided by a battery back-up. In this case the stack should be cooled to a temperature below the cathode/nickel oxidation temperature (e.g. 400° C.) before the battery back-up power is used.

In order to control the SOEC cooling rate precisely and with a higher degree of freedom a tie-in point is designed in between the high temperature heater and the SOEC, where a cooling medium such as air, $N_2$ or $CO_2$ can be added to the system and thus the cooling down rate can be increased and independently controlled. This tie-in point can be introduced on the anode side as well as on the cathode side of the SOEC.

Figure 6:
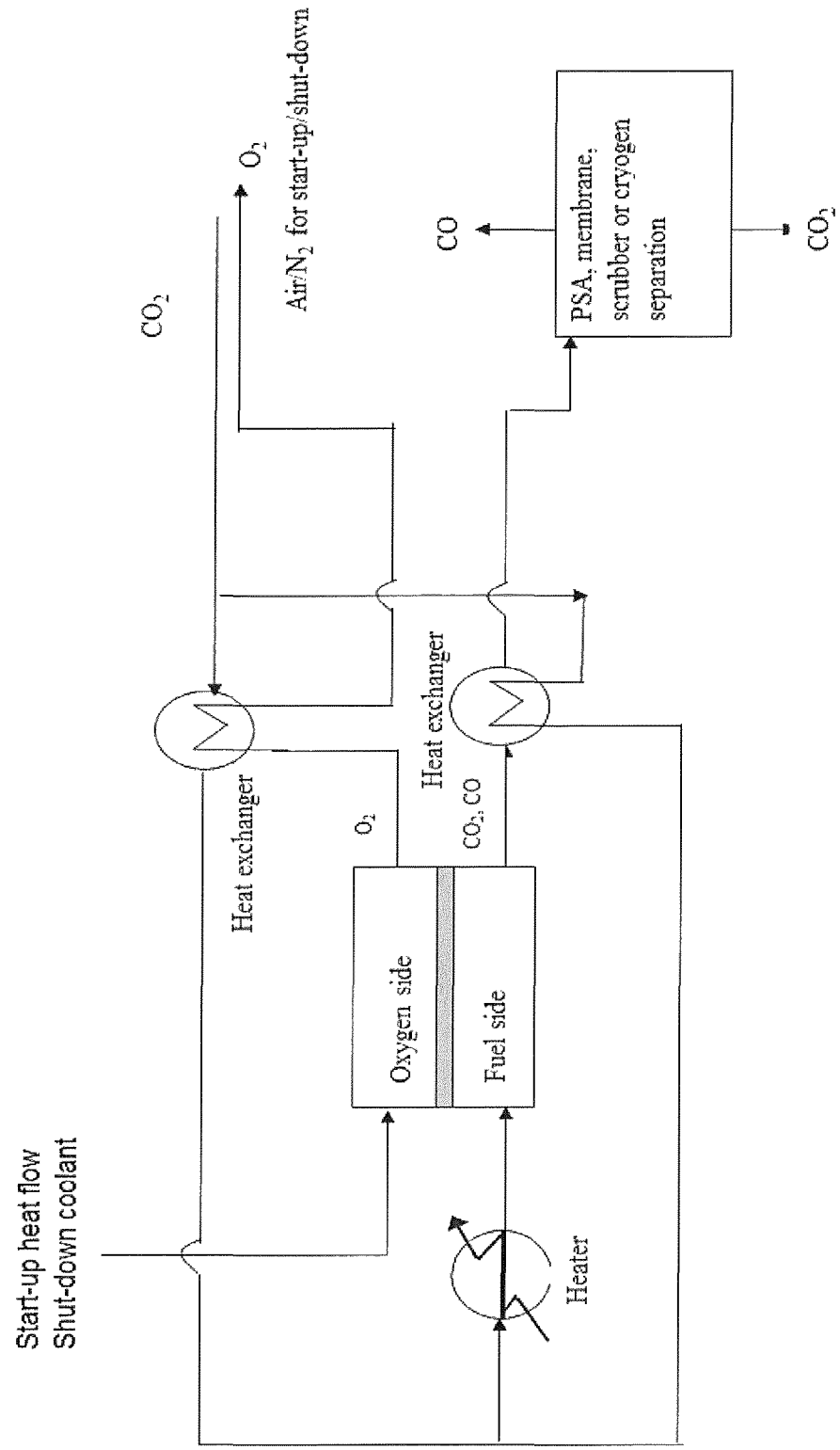
FIG. 6 shows an embodiment in which external heaters are connected to independent (large) gas flows.

In the same way as a fast cooling can be desirable, there may also be many applications where it would be desirable to be able to heat the system fast to the stack operating temperature. This can for example be achieved by sending a relatively large flow of hot gases through the stack. To increase the in-flux of heat beyond the power level of the SOEC core heaters it can be advantageous to use external heaters connected to independent (large) gas flows as shown in FIG. 6. To avoid damage to the stack the flow and temperature of the external heaters can be controlled, for example to keep the temperature gradient across the stack below a given specified level.

The gas connections for the heating and the cooling flows may be identical.

Figure 7:
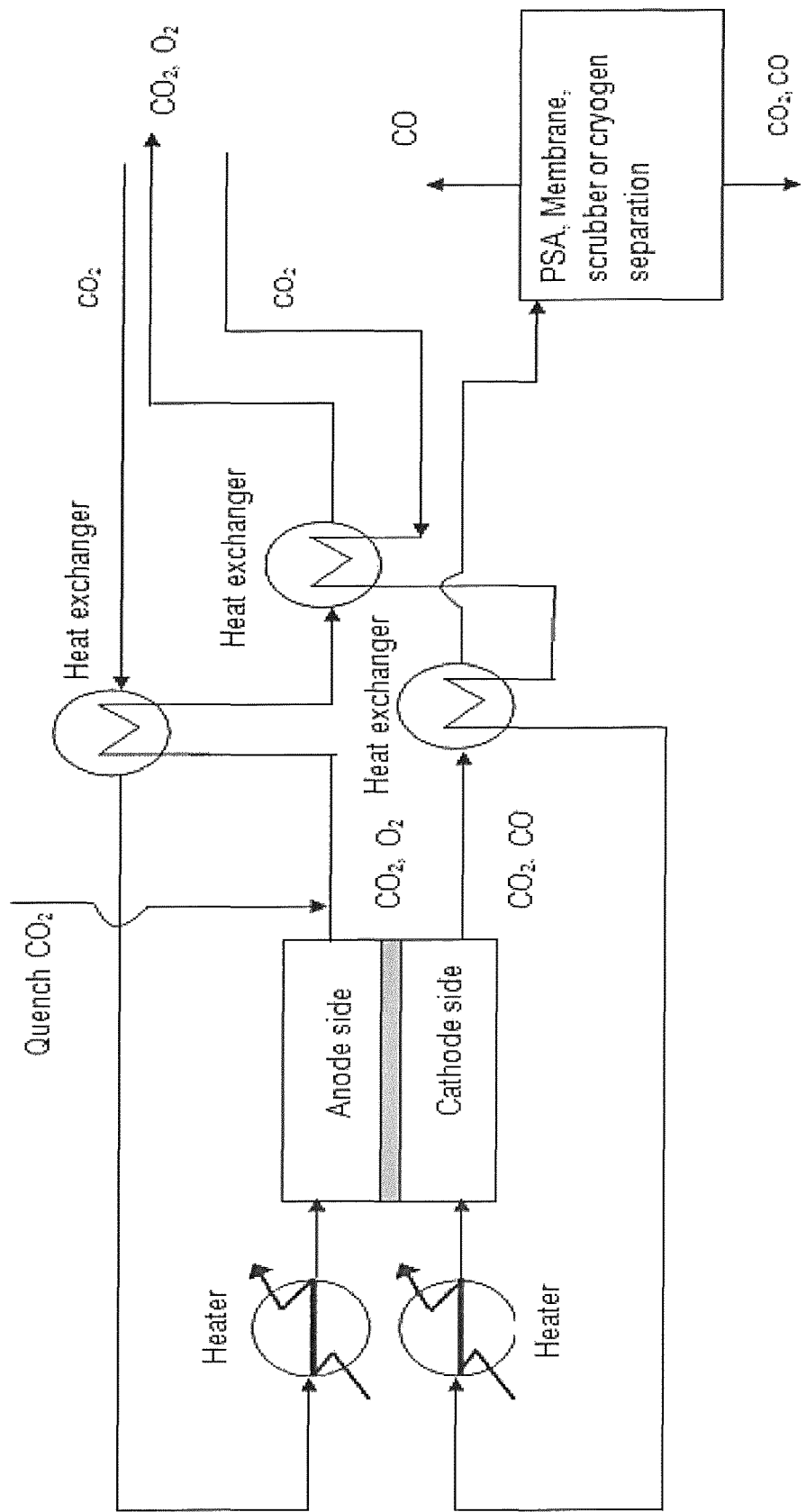
FIG. 7 shows an embodiment in which the gas coming from the cathode side of the SOEC is quenched to a temperature around 400-600° C., such that metal dusting is kinetically inhibited.

The feed effluent heat exchanger employed on the cathode side of the SOEC may be subject to corrosion due to carbon formation in the carbon monoxide-rich atmosphere present on this side. This type of corrosion is generally renowned as metal dusting, and it may be mitigated by choosing an appropriate material or coating with respect to the heat exchanger and the heat exchanger conditions. An alternative solution to the metal dusting issue is to simply quench the gas coming from the cathode side of the SOEC to a temperature around 400-600° C., where metal dusting is kinetically inhibited. The quench should be performed with an inert gas such as $N_2$, $H_2O$, but most preferably with $CO_2$. The feed effluent heat exchanger is still in service, but now utilizing the heat from a temperature range within 400-600° C., most preferably within 400-550° C., instead of from the SOEC operating temperature. This obviously reduces the overall efficiency of the plant with respect to heat and $CO_2$ consumption, but it does mitigate the metal dusting issue and it is an alternative to using more exotic materials on the cathode side; see FIG. 7.

In the gas purification step where CO is separated from $CO_2$ (using e.g. a pressure swing adsorption unit), it is an inherent fact that some of the CO will follow the $CO_2$ in the gas separation. By recycling this mix of CO and $CO_2$, an increased utilization of the feedstock and thus an increased yield with respect to CO can be obtained. In order to avoid a build-up of unwanted inert components, a purge stream must be imposed on the recycle stream. This purge stream should be passed to a catalytic oxidizer to oxidize CO to $CO_2$ or to a thermal oxidizer before reaching the surrounding environment.

In this invention, the SOEC unit together with the pre-heaters on the cathode side and the anode side as well as the feed effluent heat exchangers placed directly downstream from the SOEC unit comprise an entity called the SOEC core. This core is encapsulated and thermally insulated towards the surroundings to mitigate heat loss from and thermal gradients within these units which are operating at high temperatures.

Figure 8:
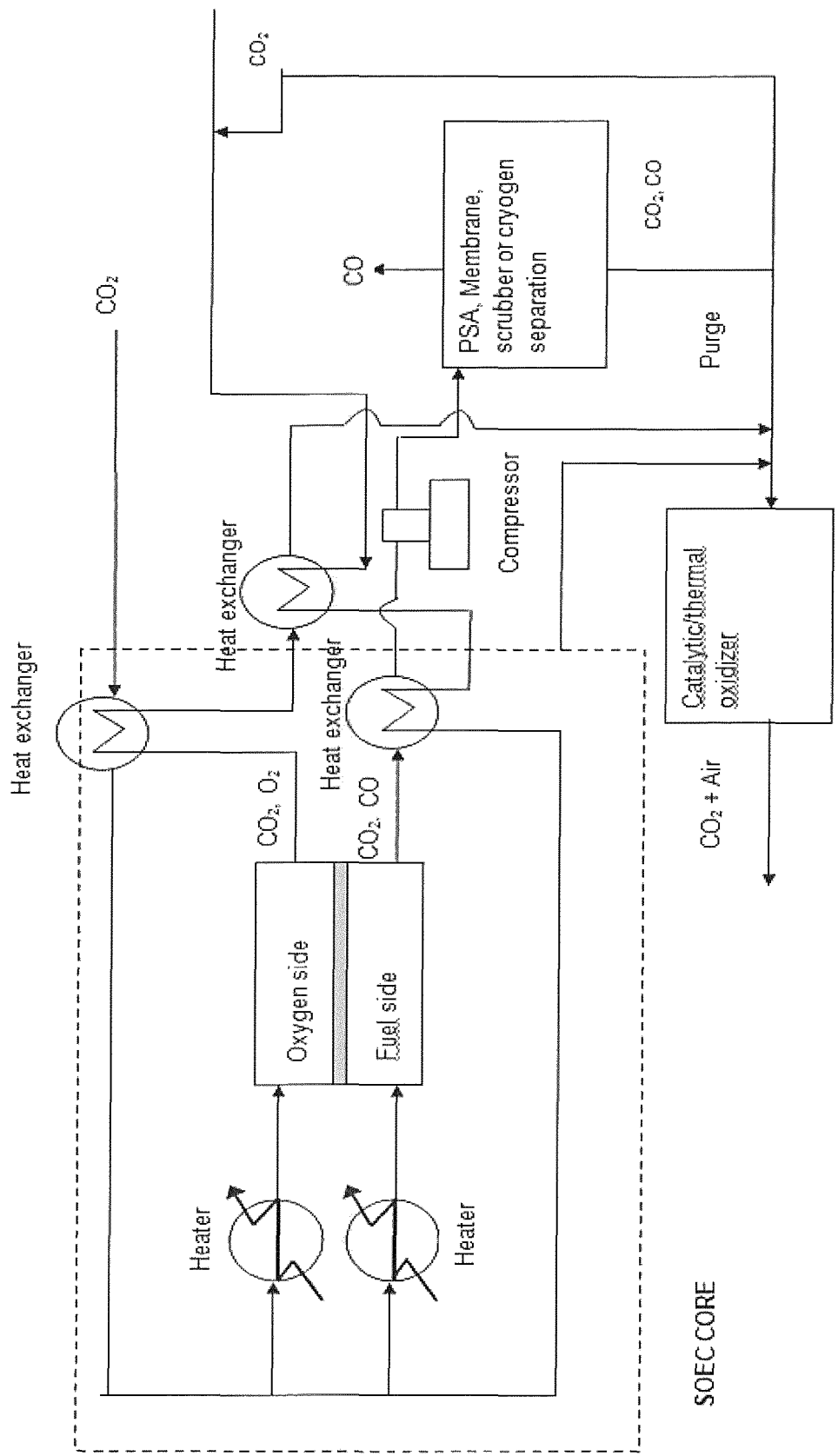
FIG. 8 shows an embodiment in which the core shell is connected to the PSA purge line, and the outlet stream from the oxygen side (anode side) of the SOEC is led to the oxidation unit, in order to assure that any leakage of CO is oxidized to $CO_2$.

In case of leakage of CO from the units within the SOEC core or from the tubes connecting the units within the SOEC core, the core shell can be connected to the PSA purge line in order to assure that any leakage of CO is oxidized to $CO_2$ in the oxidation unit. To further mitigate leakage of CO into the surroundings, also the outlet stream from the oxygen side (anode side) of the SOEC is led to the oxidation unit to ensure that any leakage of CO into the oxygen side of the system is also oxidized into $CO_2$; see FIG. 8.

As an alternative, separate oxidation units may be established for the SOEC core purge and for the oxygen side outlet of the SOEC unit. Alternatively these two streams may also share one common oxidizing unit.

In the case of a catalytic oxidizing unit, this catalytic oxidizing unit would include a catalytic oxidation reactor utilizing a catalyst. Said catalyst comprises a noble metal catalyst, such as Pt or Pd optionally combined with $V_2O_5$ and $WO_3$ on a $TiO_2$ or alumina carrier, and the catalyst operates at temperatures above 100° C., preferably between 150 and 250° C.

Figure 9:
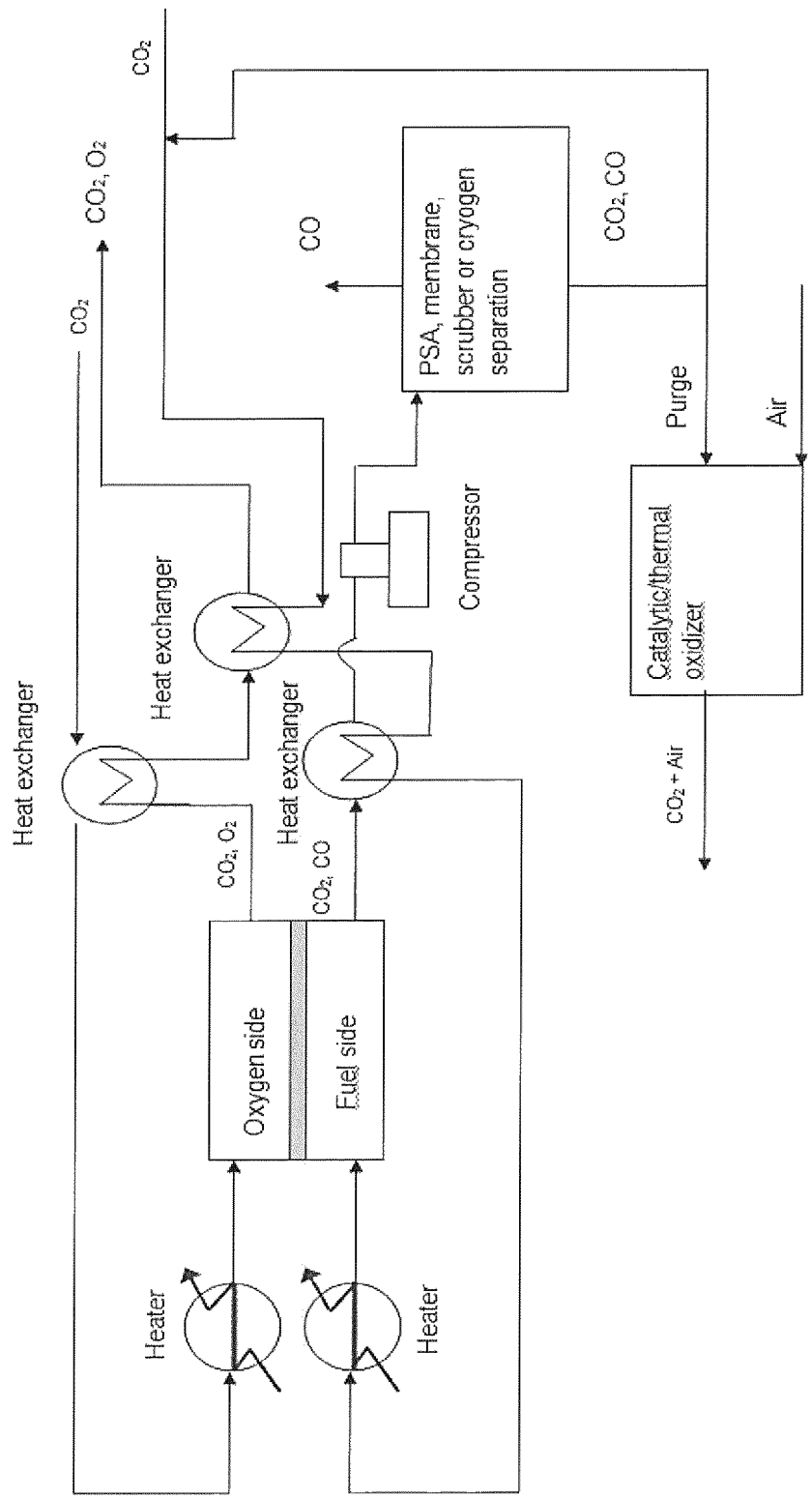
FIG. 9 shows an embodiment in which a compressor is arranged between the SOEC and the separation process to avoid the need for a recycle compressor.

In general, the $CO_2$ source is available at elevated pressure, whereas the SOEC is operating close to atmospheric pressure. With respect to recycling, by arranging a compressor between the SOEC and the separation process, such as pressure swing adsorption (PSA), the need for a recycle compressor is omitted. The apparatus layout corresponding to this embodiment of the process is illustrated in FIG. 9.

Figure 10:
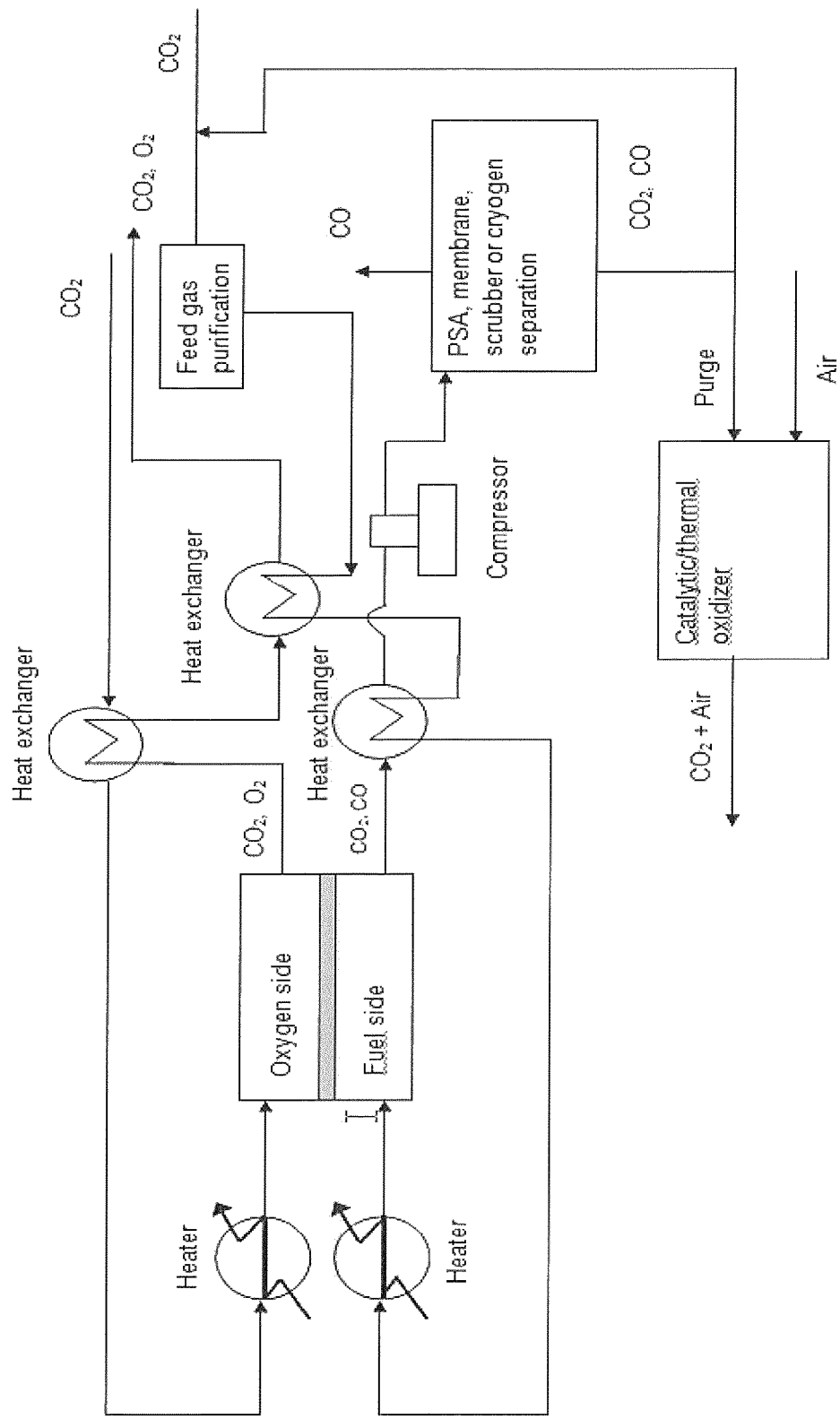
FIG. 10 shows an apparatus layout corresponding to the layout of FIG. 9, but with a feed gas purification unit added.

In addition to the purification of the product outlet stream from the SOEC, also the $CO_2$ feed gas on the fuel side may need to be purified. Adsorbents or absorbents are used upstream from the SOEC to remove undesired contaminants in the gas. Sulfur species and siloxanes in particular, but also other contaminants, such as halogens and higher hydrocarbons (e.g. benzene), are known to poison solid oxide cells. Such compounds can be absorbed, e.g. with active carbon or absorbents based on alumina, ZnO, Ni or Cu, such as Topsoe HTZ-51, Topsoe SC-101 and Topsoe ST-101. FIG. 10 shows an apparatus layout corresponding to that shown in FIG. 9, but with a feed gas purification unit added.

Carbon formation can also be suppressed by addition of $H_2S$. Both carbon formation and metal dusting are normally considered to take place through the following reactions:

$$2CO \rightarrow C + CO_2 \text{ (Boudouard reaction) and}$$

$$H_2 + CO \rightarrow H_2O + C \text{ (CO reduction)}$$

An addition of $H_2S$ does not affect the thermodynamic potential for metal dusting, but it pacifies the metal surfaces so that the sites, where the carbon-forming reactions would take place, are blocked.

In the case of using SOECs for CO production, a high degree of conversion of $CO_2$ to CO may result in a gas composition, with which there is a potential for carbon formation from the Boudouard reaction, and in the case of co-production of $H_2$ and CO there may be a potential for carbon formation from the Boudouard reaction and from CO reduction. In particular, uneven flow distribution and current density etc. may cause local variation of the CO content above the potential limit for carbon formation.

Adding $H_2S$ to the feed stream to a level of $H_2S$ between 50 ppb and 2 ppm, most preferably between 100 ppb and 1 ppm, would effectively suppress carbon formation in the SOEC stack, i.e. in the Ni-containing cathode, and also protect downstream equipment from metal dusting attacks. The relatively low level mentioned above is enough to suppress the formation of carbon, and at the same time it does not cause any detrimental effects on the SOEC stack performance.

Figure 13:
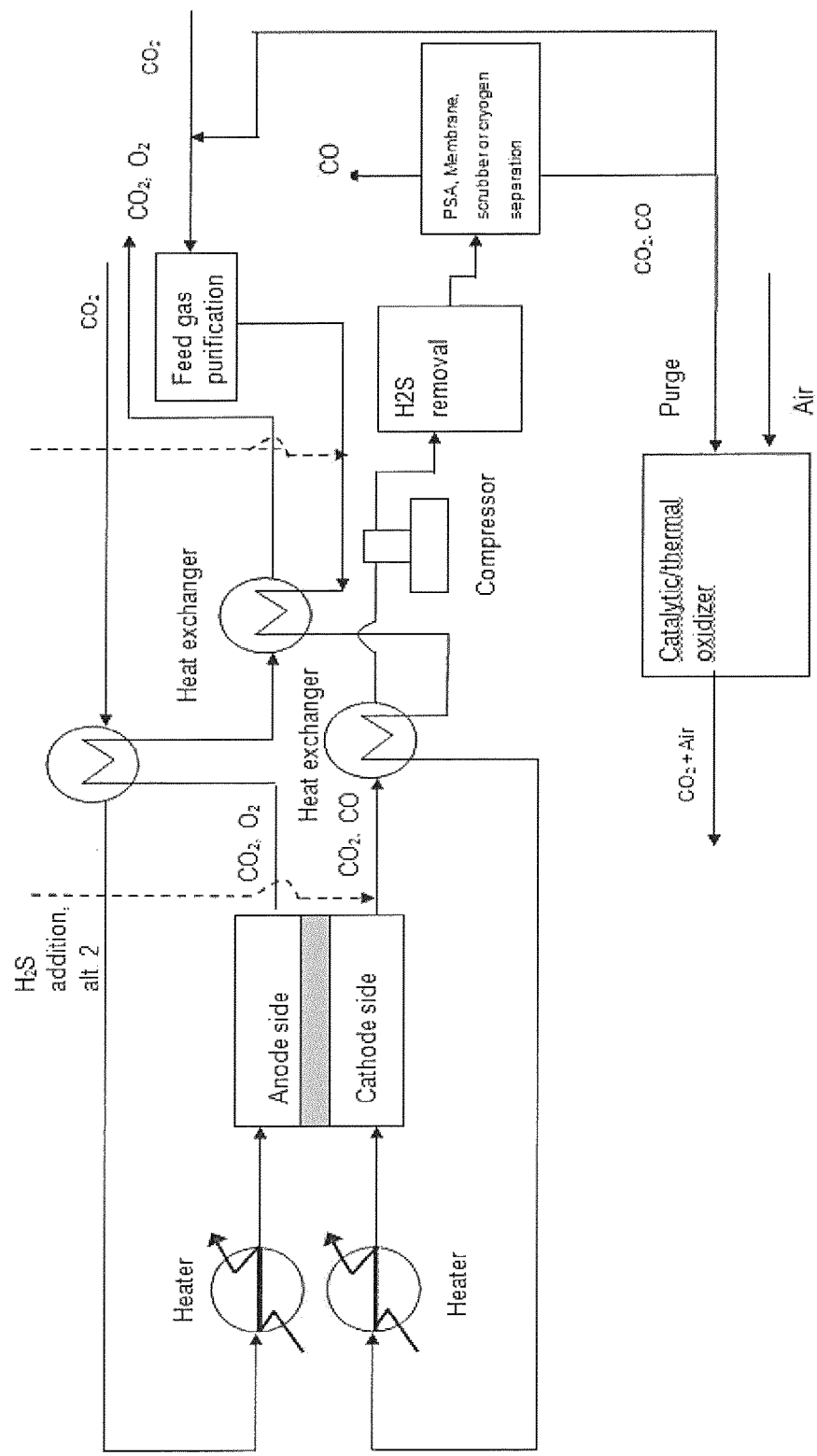
FIG. 13 shows an embodiment in which $H_2S$ is added to the feed gas just downstream from the feed gas purification unit to protect the SOEC and the downstream equipment from carbon formation and metal dusting, or in which $H_2S$ is added just downstream from the SOEC to only protect the downstream equipment from metal dusting.

$H_2S$ can be added to the feed gas just downstream from the feed gas purification unit to protect the SOEC and the downstream equipment from carbon formation and metal dusting. As an alternative, $H_2S$ can be added just downstream from the SOEC to only protect the downstream equipment from metal dusting. This embodiment of the invention is illustrated in FIG. 13.

To remove the sulfur from the product gas, the same adsorbents as used for the feed gas purification can be used, i.e. active carbon or adsorbents based on alumina, ZnO, Ni or Cu, such as Topsoe HTZ-51, Topsoe SC-101 and Topsoe ST-101. The purification unit is preferably placed between the product gas compressor and the product purification unit.

The basic principle for feed gas purification is chemisorption of the sulfur compounds onto the active sites of the materials mentioned above. However, in the case of Ni and Cu these must stay in reduced state in order to maintain their performance with regards to feed gas purification. It should be noted, however, that pure $CO_2$ is in essence an oxidizing environment, and there is thus a risk of oxidation with regards to Cu and Ni. The risk of oxidation is dependent on operating temperature, but for example Cu distributed over a high surface area carrier may oxidize also at temperatures close to ambient temperature.

It is also essential to assure reducing conditions on the feed side, where the Ni-containing anode has to be kept in a reduced state at all times for temperatures above 400° C.

In summary it is desirable to ensure reducing conditions with respect to feed gas purification and also with respect to the integrity of the SOEC. This can be accomplished by recycling CO from the SOEC.

Figure 14A:
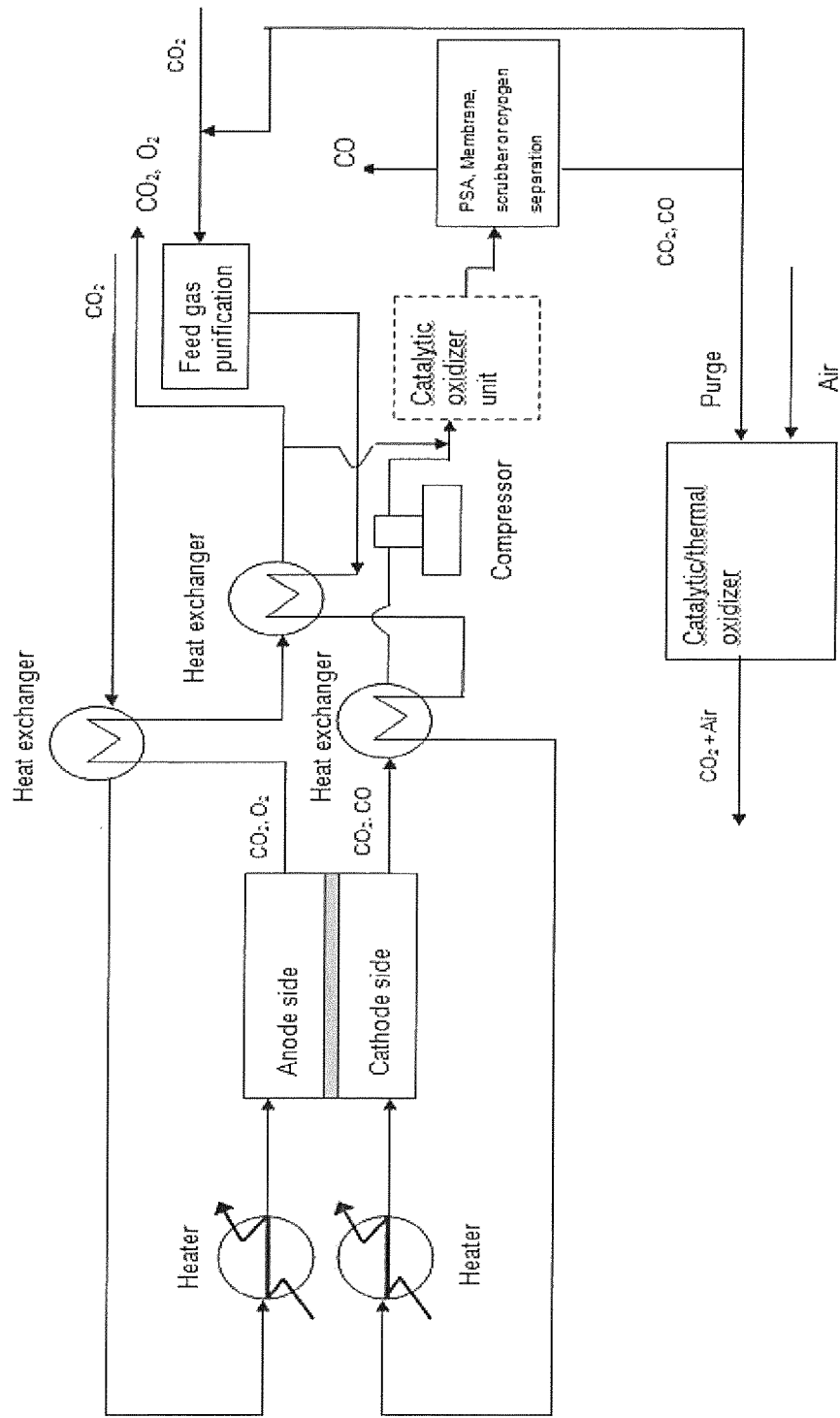
FIGS. 14a and 14b show an embodiment in which $H_2$ is removed by selective oxidation of hydrogen.
Figure 14B:
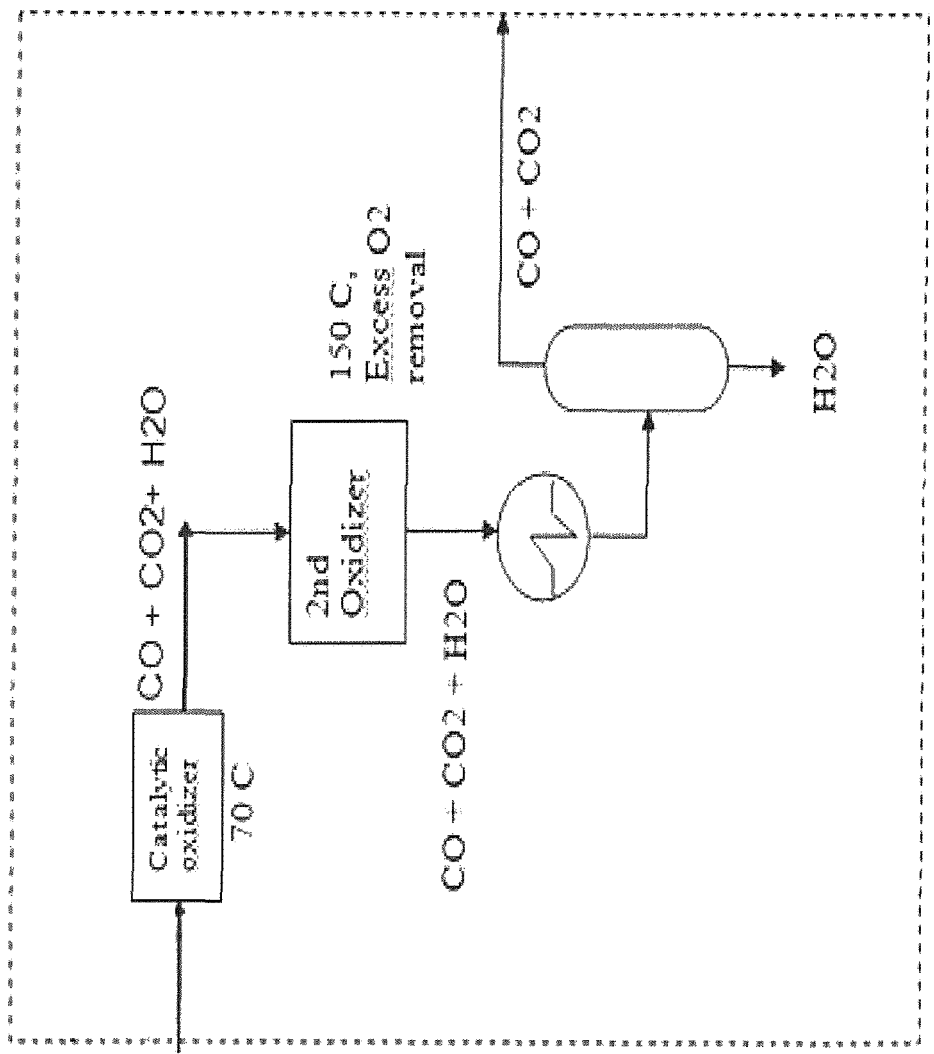

However, to obtain a system which is not dependent on a recycle stream, an addition of small amounts of $H_2$ is a more practical solution from an operational point of view, as on-site storage of CO often provides challenges with respect to safety precautions due to the hazardous nature of this gas. This embodiment of the invention is illustrated in FIGS. 14a and b.

In order to avoid complicating the product purification process (PSA, TSA, membrane separation, cryogenic separation or liquid scrubber technology), $H_2$ can be removed by selective oxidation of hydrogen:

$$2H_2 + O_2 \rightarrow 2H_2O$$

The water formed is easily separated using cooling and condensation. This will make it possible to use $H_2$ in any SOEC operation where the target product is CO.

$H_2$ is oxidized over oxidation catalysts at a lower temperature than CO. The applicable temperature level depends on the catalyst. A Pd or Pt catalyst can be expected to oxidize $H_2$ at temperature levels from ambient temperature to 70° C., whereas temperatures above 150° C. are needed to oxidize CO. By adding a stoichiometric level of the $O_2$ required to oxidize the $H_2$ present in the gas and passing the gas through a reactor containing an oxidation catalyst operating at a temperature, where $H_2$ is selectively oxidized, the $CO/CO_2$ product stream is effectively cleaned from $H_2$.

In practice it may be convenient to avoid close control of the $H_2$ level in the gas and accurate dosing of $O_2$, and thus a slight surplus (say 10%) of oxygen may be applied and the remaining $O_2$ removed in a second oxidizing reactor operating at a temperature above the oxidation temperature for CO. This assures full removal of $O_2$ and provides an extra safety for complete removal of $H_2$.

$O_2$ can be drawn conveniently from the $O_2$—$CO_2$ mix on the anode side of the SOEC.

Figure 11:
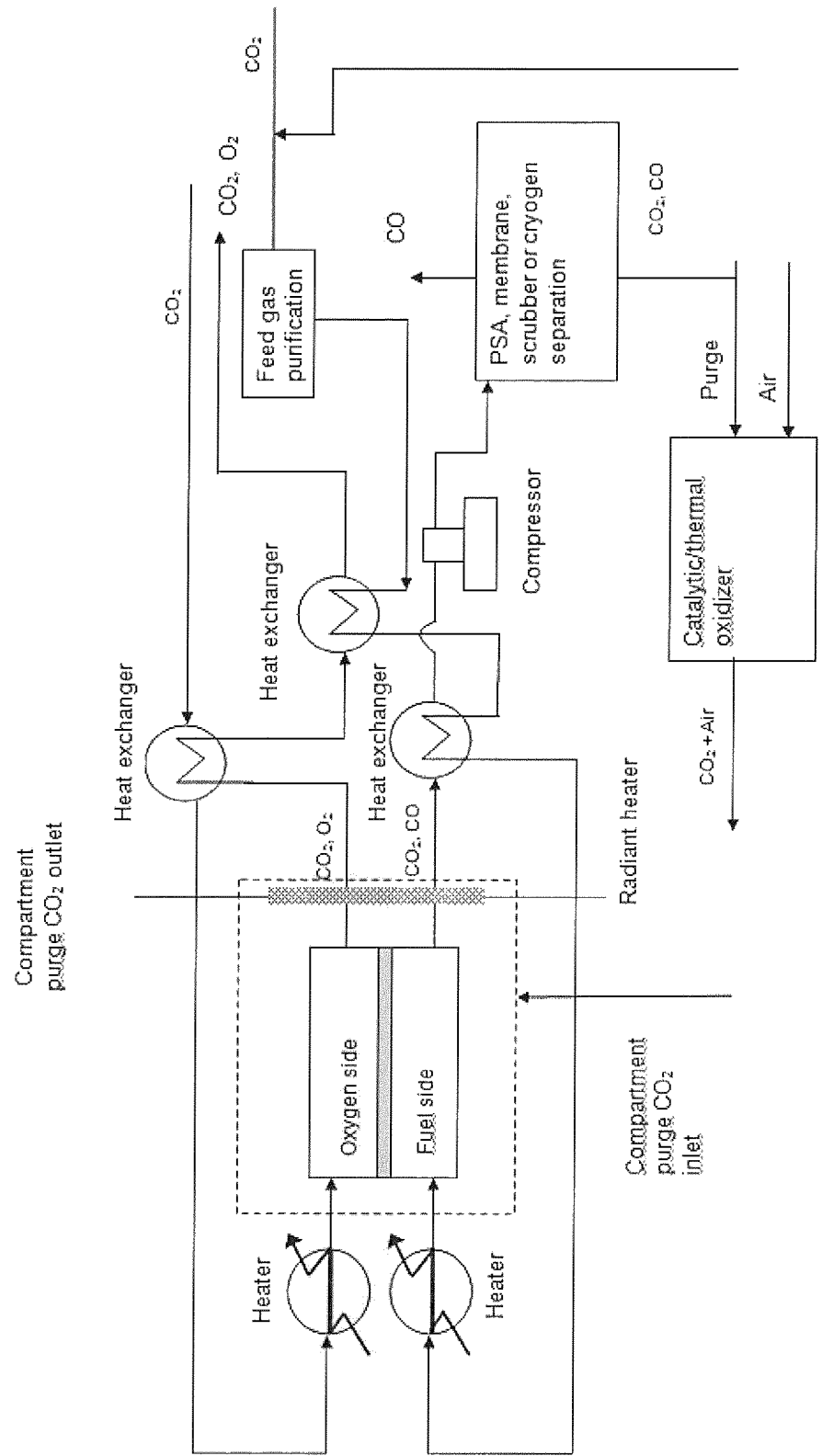
FIG. 11 shows an embodiment in which, to avoid penetration of ambient air into the SOEC stack, the compartment around the stack is purged with $CO_2$, with a radiant heater installed to bring the CO2 gas up to the operating temperature of the SOEC stack or above.

Finally, in order to avoid penetration of ambient air into the SOEC stack, the compartment around the stack may be purged with $CO_2$. With the purpose of further utilizing this purge stream, a heater is installed to bring the inlet $CO_2$ gas, utilized as a compartment purge, up to the operating temperature of the SOEC stack or above. This heater could for example be applied as a radiant heater, where the heater is incorporated in the $CO_2$ purge gas manifold, simultaneously heating the physical perimeter of the stack and the inlet $CO_2$ purge gas. In this configuration, which is shown in FIG. 11, the radiant heater can replace the oxygen side inlet heater, or alternatively it can be used as an additional heater which is used to reduce the time for cold start-up.

With respect to feed stock, the current invention focuses on applications, where carbon monoxide is the desired product, but the principles applied and the process configurations are also valid for the cases, where a mixture of $CO_2$ and steam comprises the feed stock and a mixture of hydrogen and CO is the desired product. In all given embodiments and examples and for the case of utilizing a mix of $CO_2$ and steam as feedstock, steam will follow $CO_2$ and $H_2$ will follow the CO product gas. However in the two-step PSA purification approach described above, the final PSA step would separate $H_2$ from CO and is thus only applicable in cases where splitting $H_2$ from CO is desired for the downstream process. With respect to product gas purification, steam is preferably removed from the product stream upstream from the product gas separation unit.

In large systems, several stacks or stack sections will typically be used. Here it is a potential issue that if a stack leakage (e.g. a broken cell) appears in one stack, this may damage the neighboring stack. The mechanism here is that a crack in one cell leads to spontaneous combustion between the produced product gases and the produced oxygen. This will create a hot spot around the crack, which may create a thermal stress that enlarges the crack. This in turn leads to a large and very hot spot, which may cause a thermal stress also in neighboring cells, which again may lead to cracks in the cells. Eventually this can lead to the destruction of the entire stack and possibly also to the destruction of neighboring stacks.

Figure 12:
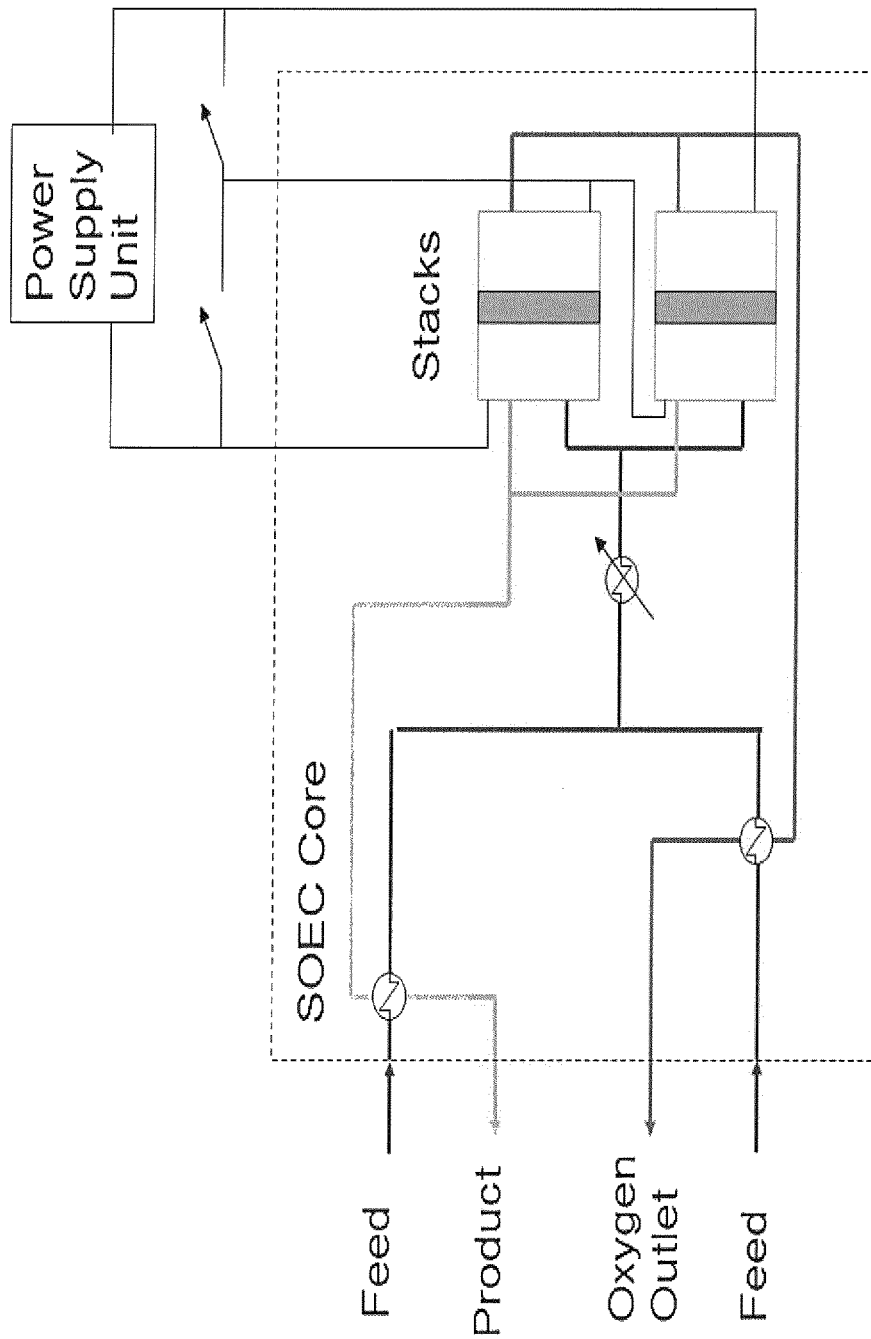
FIG. 12 shows a system layout to remove the electrolysis current selectively from failing stacks or failing stack sections, either by providing individual control (power supplies) for each stack (section) or by using electrical switches, which can short-circuit failing stacks or stack sections.

To avoid such a scenario, one preferred system lay-out illustrated in FIG. 12 makes it possible to remove the electrolysis current selectively from failing stacks or failing stack sections. This can be done either by individual control (power supplies) for each stack (section) or by using electrical switches which can short-circuit failing stacks or stack sections.

Once a stack or a stack section is switched off, the concentration of the desired product gas in the product gas flow will be reduced, and it is therefore desirable:
- to use a gas separation unit (e.g. a PSA) with sufficient dynamic range to handle these changes in product gas compositions, and
- to operate the system under conditions, where the current through the other stacks can be increased when a stack (section) is switched off. In this case the product gas composition can become more or less independent of the failure of one or even several stack (section) failures.

The invention claimed is:

1. A process for producing carbon monoxide (CO) from carbon dioxide ($CO_2$) in a solid oxide electrolysis cell (SOEC) stack, wherein $CO_2$ is led to the fuel side of the SOEC with an applied current, and wherein the content of CO in the output from the SOEC stack is 20-80 wt %, said process further comprising:
  heating the inlet gas on the fuel side by means of a heating unit, so as to supply heat to the SOEC, wherein the operation temperature of said heating unit is at least the operation temperature of the cell stack minus 50° C., and
  heating the inlet gas on the oxygen side by means of a heating unit, so as to supply heat to the SOEC, wherein the operation temperature of said heating unit is at least the operation temperature of the cell stack minus 50° C., wherein:
    a suitable operating temperature for the SOEC is maintained with feed effluent heat exchangers incorporated on both the oxygen side and the fuel side of the SOEC,
    the carbon dioxide from a separation unit, which still contains some carbon monoxide, is recycled to the fuel side of the SOEC and tied to the $CO_2$ feed stream upstream from a feed gas purification unit,
    a compartment around the SOEC stack is purged with $CO_2$, and
    a heater is installed to bring the inlet $CO_2$ gas, utilized as a compartment purge, up to the operating temperature of the SOEC stack or above.

2. The process according to claim 1, wherein a product stream from the SOEC stack is subjected to a separation process in the separation unit, said separation unit being selected from pressure swing adsorption (PSA), temperature swing adsorption (TSA), membrane separation, cryogenic separation and liquid scrubber technology, such as wash with N-methyl-diethanolamine (MDEA).

3. The process according to claim 2, wherein the pressure swing adsorption (PSA) unit comprises an adsorption step consisting of two or more adsorption columns, each containing adsorbents with selective adsorption properties towards carbon dioxide.

4. The process according to claim 2, wherein the pressure swing adsorption (PSA) unit comprises an adsorption step consisting of two or more adsorption columns, each containing adsorbents with selective adsorption properties towards carbon monoxide.

5. The process according to claim 2, wherein the pressure swing adsorption (PSA) unit comprises at least two adsorption steps, of which the first step comprises two or more adsorption columns, each containing adsorbents with selective adsorption properties towards carbon dioxide, while the second step comprises two or more adsorption columns, each containing adsorbents with selective adsorption properties towards carbon monoxide.

6. The process according to claim 1, wherein no flushing on the oxygen side is used and feed gas in the form of $CO_2$ is provided by two individually controlled flows, of which one shares a heat exchanger with the output flow from the fuel side of the stack and the other shares a heat exchanger with the output flow from the oxygen side of the stack.

7. The process according to claim 1, wherein a cooling-down rate of the system is controlled, and wherein a fast cooling to below 300° C. in less than 24 hours is secured through addition of a cooling medium to the system in case of power failure.

8. The process according to claim 1, wherein the carbon dioxide from the separation unit, which still contains some carbon monoxide, is recycled to the fuel side of the SOEC.

9. The process according to claim 7, wherein a compressor is placed between the SOEC stack and the separation unit.

10. The process according to claim 7, wherein a purge stream is imposed on the recycle stream to avoid a build-up of unwanted inert components, said purge stream being passed to a catalytic oxidizer to oxidize CO to $CO_2$ or to a thermal oxidizer before reaching the surrounding environment.

11. The process according to claim 1, wherein the gas coming from the cathode side of the SOEC is quenched to a temperature of about 400-600° C. to avoid metal dusting.

12. The process according to claim 11, wherein the quench is carried out with an inert gas, such as $N_2$, or preferably with $CO_2$.

13. The process according to claim 11, wherein the feed effluent heat exchanger utilizes the heat from a temperature range within 400-600° C. instead of from the SOEC operating temperature in order to mitigate metal dusting.

14. The process according to claim 1, wherein $H_2S$ is added to the feed stream to a level between 50 ppb and 2 ppm to suppress carbon formation in the system.

15. The process according to claim 14, wherein the $H_2S$ is added to the feed gas immediately downstream from the feed gas purification unit to protect the SOEC stack and the downstream equipment from carbon formation and metal dusting.

16. The process according to claim 14, wherein the $H_2S$ is added to the feed gas immediately downstream from the SOEC stack to protect the SOEC stack and the downstream equipment from carbon formation and metal dusting.

17. The process according to claim 1, wherein a feed gas purification unit utilizing adsorbents based on active carbon, alumina, ZnO, Ni or Cu is added to avoid poisoning of the SOEC.

18. The process according to claim 1, wherein small amounts of $H_2$ are added to obtain a system which is not dependent on a recycle stream.

19. The process according to claim 1, wherein the heater is applied as a radiant heater, which is incorporated in the $CO_2$ purge gas manifold, simultaneously heating the physical perimeter of the stack and the inlet $CO_2$ purge gas.

* * * * *